US011769359B2

(12) United States Patent
Merideth et al.

(10) Patent No.: US 11,769,359 B2
(45) Date of Patent: Sep. 26, 2023

(54) SYSTEMS, STRUCTURES, AND METHODS FOR ACCESSING POWER LOCKED PANELS

(71) Applicant: Rivian IP Holdings, LLC, Plymouth, MI (US)

(72) Inventors: Marcus Merideth, Westland, MI (US); Kosta Papanikolaou, Huntington Woods, MI (US); Shreyas Sansuddi, Costa Mesa, CA (US); Thomas Young, Costa Mesa, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 43 days.

(21) Appl. No.: 17/382,589

(22) Filed: Jul. 22, 2021

(65) Prior Publication Data

US 2023/0027174 A1 Jan. 26, 2023

(51) Int. Cl.
*G07C 9/00* (2020.01)
*G07C 9/27* (2020.01)

(52) U.S. Cl.
CPC ..... *G07C 9/00309* (2013.01); *G07C 9/00571* (2013.01); *G07C 9/27* (2020.01); *G07C 2009/00253* (2013.01); *G07C 2009/00404* (2013.01); *G07C 2009/00412* (2013.01)

(58) Field of Classification Search
CPC .. G07C 9/00309; G07C 9/27; G07C 9/00571; G07C 2009/00253; B60R 25/24
See application file for complete search history.

(56) References Cited

U.S. PATENT DOCUMENTS

| | | | | |
|---|---|---|---|---|
| 11,288,907 | B1 * | 3/2022 | Hsieh | G07C 9/33 |
| 2016/0150411 | A1 * | 5/2016 | Liu | H04L 63/0853 726/4 |
| 2018/0005470 | A1 * | 1/2018 | Stephens | G07C 9/00309 |
| 2019/0248330 | A1 * | 8/2019 | Asano | G07C 9/00 |
| 2020/0216030 | A1 * | 7/2020 | Craciun | H02J 7/00045 |
| 2020/0219334 | A1 * | 7/2020 | Emmerling | B60L 58/12 |
| 2020/0318399 | A1 * | 10/2020 | Ueki | B60L 50/00 |

* cited by examiner

*Primary Examiner* — Nabil H Syed
(74) *Attorney, Agent, or Firm* — Clements Bernard Walker; Christopher L. Bernard

(57) ABSTRACT

Various disclosed embodiments include illustrative systems, structures, and methods for performing authenticated access to a structure. An illustrative system includes a connector configured to be operably connected to a personal electronics device and to receive an electric charge from the personal electronics device, a controller couplable to an electromechanical locking device and the connector, and a memory. The memory is configured to store computer-executable instructions configured to cause the controller to receive first authentication information, receive second authentication information from the personal electronics device, authenticate the personal electronics device responsive to the first authentication information and the received second authentication information, and activate an electromechanical locking device to unlock responsive to the electric charge and a successful authentication.

20 Claims, 4 Drawing Sheets

SYSTEMS, STRUCTURES, AND METHODS FOR ACCESSING POWER LOCKED PANELS

INTRODUCTION

The present disclosure relates to battery powered locking devices. The statements in this section merely provide background information related to the present disclosure and may not constitute prior art.

Electric locking systems for standalone structures, such as vehicles, use an internal battery for operations. Insufficient battery power may cause an electric locking system to be inoperable, thus locking out a driver or an operator of a vehicle.

BRIEF SUMMARY

Various disclosed embodiments include illustrative systems, structures, and methods for performing authenticated access to a structure.

In an illustrative embodiment, a system includes a connector configured to be operably connected to a personal electronics device and to receive an electric charge from the personal electronics device, a controller couplable to an electromechanical locking device and the connector, and a memory. The memory is configured to store computer-executable instructions configured to cause the controller to receive first authentication information, receive second authentication information from the personal electronics device, authenticate the personal electronics device responsive to the the first authentication information and the received second authentication information, and activate an electromechanical locking device to unlock responsive to the electric charge and a successful authentication.

In another illustrative embodiment, a structure includes a source of direct current (DC) power, a lockable panel configured to block an opening associated with the structure, an electromechanical locking device, a lock controller, and an access system. The electromechanical locking device is configured to be operably connected to the DC power source and to put the lockable panel in a locked state and an unlocked state. The lock controller is configured to place the electromechanical locking device in the locked state and the unlocked state using power from the source of DC power responsive to an activation action and to provide first authentication information. The access system includes a connector configured to be operably connected to a personal electronics device, a controller couplable to the electromechanical locking device and the connector; and a memory. The memory is configured to store computer-executable instructions configured to cause the controller to receive the first authentication information from the lock controller, receive second authentication information from the personal electronics device, authenticate the personal electronics device responsive to the first authentication information and the second authentication information, and activate the electromechanical locking device to unlock responsive to the received electric charge and a successful authentication.

In another illustrative embodiment, a method includes receiving first authentication information, receiving an electric charge from a personal electronics device, receiving second authentication information from the personal electronics device, authenticating the personal electronics device responsive to the first authentication information and the second authentication information, and activating an electromechanical locking device to unlock responsive to the received electric charge and a successful authentication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
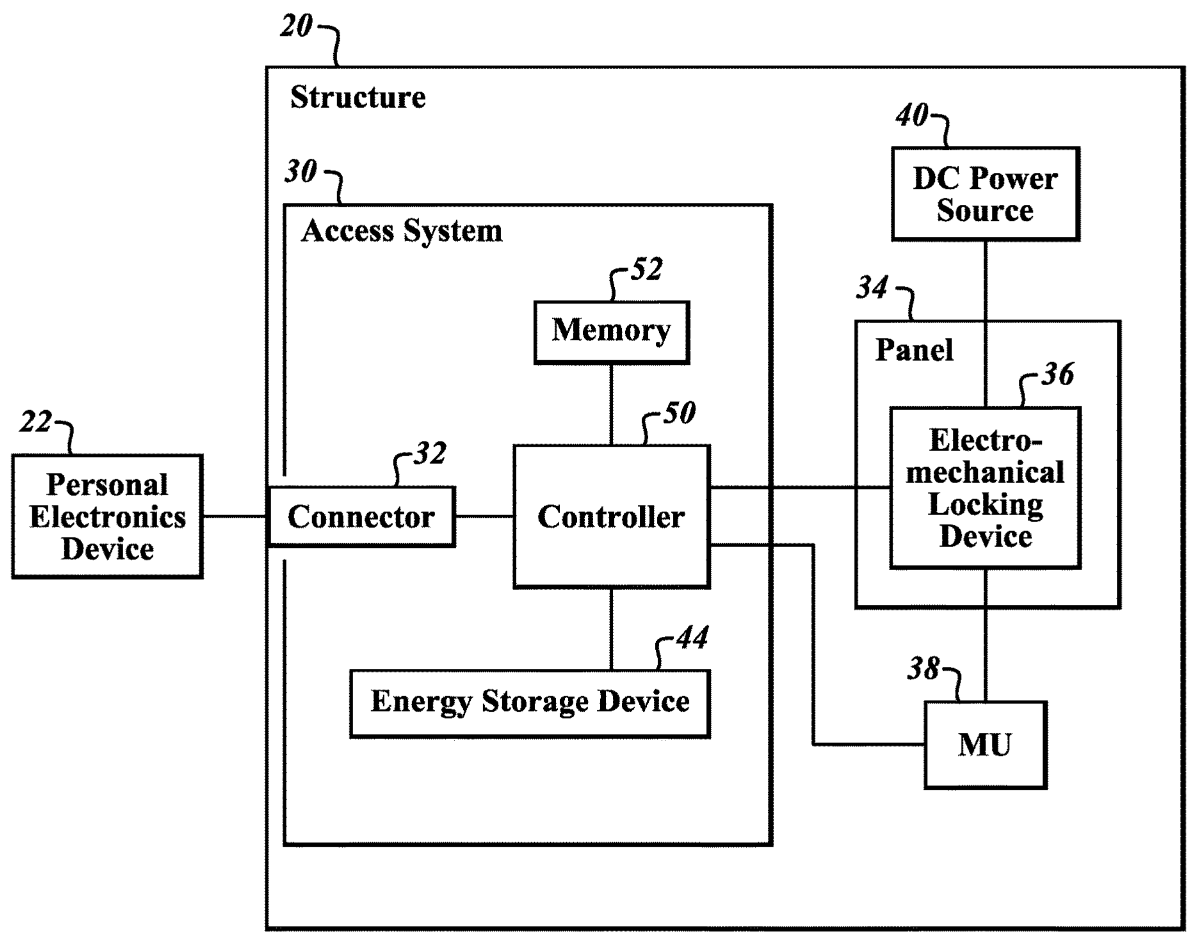
FIG. 1 is a block diagram of an illustrative system used in authenticated unlocking operations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative systems, structures, and methods. As will be explained below, such embodiments can provide authenticated access operations.

Referring to FIG. 1, in various embodiments an illustrative structure 20 may be configured to perform authenticated access operations. In various embodiments the structure 20 includes a direct current (DC) power source 40, a lockable panel 34 configured to block an opening of the structure 20, and an access system 30. The lockable panel 34 includes an electromechanical locking device 36. The electromechanical locking device 36 operably connects to the source of DC power 40. The access system 30 may include a connector 32 configured to be operably couplable to a personal electronics device (PED) 22, a controller 50 couplable to the electromechanical locking device 36, and a memory 52 couplable to the controller 50. The memory 52 is configured to store computer-executable instructions configured to cause the controller 50 to receive a DC charge from the PED 22 and receive first authentication information from another component or generate the first authentication information as will be described in more detail below. Also, the instructions are configured to cause the controller 50 to receive second authentication information from the PED 22; authenticate the PED 22 responsive to the received DC charge, the first authentication information, and the second authentication information; and activate the electromechanical locking device 36 responsive to the received DC charge and a successful authentication.

In various embodiments the access system 30 includes an energy storage device 44 couplable to the controller 50. The energy storage device 44 is configured to store a charge responsive to the DC charge received from the PED 22. The electromechanical locking device 36 is further activated by sending DC current from the energy storage device 44 to the electromechanical locking device 36 responsive to the energy storage device 44 having a charge value greater than a threshold amount and a successful authentication.

In various embodiments and given by way of example only and not of limitation, the connector 32 may include electrical leads or plug configured to receive or attach to an access port of the PED 22. In various embodiments the connector 32 may include wireless charging mechanism, such as, without limitations, electromagnetic induction charging components or the like. The PED 22 may include corresponding electromagnetic induction charging components for producing a magnetic field configured to induce a electromotive force in the connector 32. The connector 32 may allow data as well as power to be communicated between the PED 22 and the controller 50.

In various embodiments and given by way of example only and not of limitation, the energy storage device 44 may include any suitable energy storage device, such as without limitation a rechargeable battery, a capacitor, or the like. The energy storage device 44 is capable of using an electrical charge or an electro-magnetic charge from the PED 22 to store energy sufficient to operate the electromechanical locking device 36. In various embodiments the electromechanical locking device 36 operates at a predetermined voltage value that is greater than a voltage value supplied by the PED 22, such as, for example and without limitation pagers, cell phones, portable digital assistants, watches, audio devices, or the like. The PED 22 may produce a voltage value, such as without limitation 5 volts (V) or so, that is less than the voltage value for operating the electromechanical locking device 36, such as without limitation 12 V or so.

In various embodiments the PED 22 may produce voltage values equal to or greater than the voltage value for operating the electromechanical locking device 36. In this situation the energy storage device 44 is unnecessary—because the electromechanical locking device 36 may be powered directly by the PED 22.

In various embodiments and given by way of example only and not of limitation, the source of DC power 40 may include a device configured to generate electrical power for use by components of the structure 20. The source of DC power 40 may be a battery or comparable power-generating devices. The battery may suitably include high energy rechargeable batteries that store electrical charge and discharge electrical current upon request. The battery may be structured in any desirable form, such as, without limitation, cylindrical, pouch, prismatic, massless, or other comparable forms. Generally, the battery includes Li-ion batteries, such as, without limitation, Nickel Cobalt Aluminum batteries, Lithium Manganese Cobalt batteries, or Lithium Manganese Oxide batteries. However, other materials may be used for providing comparable recharging, energy density, and energy discharge capabilities as desired for a particular application.

It will be appreciated that the structure 20 may be any structure whatsoever that has the panel 34 used for accessing an enclosed space. The panel 34 may include a hinged door, a pocket door, a tract door, or any device that obstructs access to space of the structure 20. In various embodiments the structure 20 may be a structure not having access or continuous access to an unlimited power supply, such as, without limitation, a power grid. The structure 20 may include a moveable structure, such as a vehicle like a motor vehicle, a trailer, a marine vessel, a train, an aircraft, or the like. The enclosed space of the structure 20 may include an occupant cabin, a battery jump access port, or the like. The battery jump access port may include leads couplable to the source of DC power 40 for allowing a user to recharge or jump the source of DC power 40 with an external DC power supply, such as, without limitation, another structure having a DC power source, such as without limitation, a battery, a DC generator, or the like. An alternating current (AC) power source may be coupled to the battery jump access port with a rectifier or comparable device disposed between the battery jump access port and the source of DC power 40.

Figure 2:
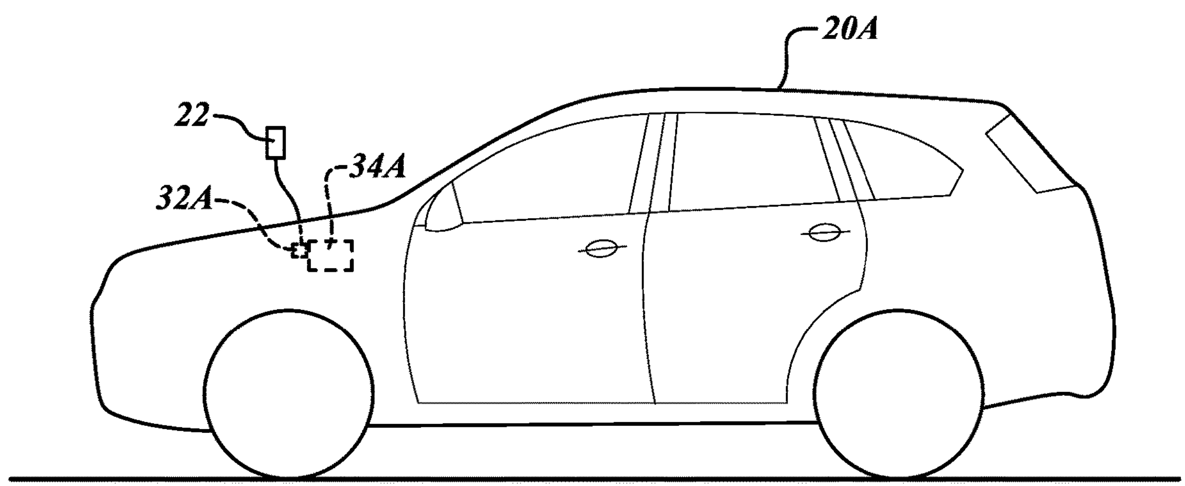
FIG. 2 is an illustrative vehicle including the components shown in FIG. 1.

Referring additionally to FIG. 2 the structure may be, without limitations, a vehicle 20A. The vehicle 20A may include a panel 34A that provides access to battery jump leads, a mechanism for unlocking doors of the vehicle 20A, or the like. The mechanism for unlocking doors of the vehicle 20A may include, such as without limitation, a latch release, electrical leads coupled to a lock/latch for a door of the vehicle 20, or the like. The vehicle 20A may include a connector 32A for wirelessly connecting and/or attaching to a PED 22. The connector 32A may provide DC current from a battery of the PED 22. The connector 32A may allow data communication between the PED 22 and the controller 50 (FIG. 1).

In various embodiments the structure 20 may include a management unit 38 configured to aid in authenticating the PED 22 as will be described in more detail below. In various embodiments the management unit 38 and the access system 30 may communicate with each other and with numerous other vehicle components via a network such as a peer-to-peer network bus, such as a controller area network (CAN) bus. Other peer-to-peer network buses, such as a local area network (LAN), a wide area network (WAN), or a value-added network (VAN), may also be used for enabling communication between the components connected to the peer-to-peer network.

It will be appreciated that the functions described herein for the access system 30 and the management unit 38 may be distributed between other data processing components of the structure 20, or to other devices that are in communication with components of the structure 20.

Figure 3:
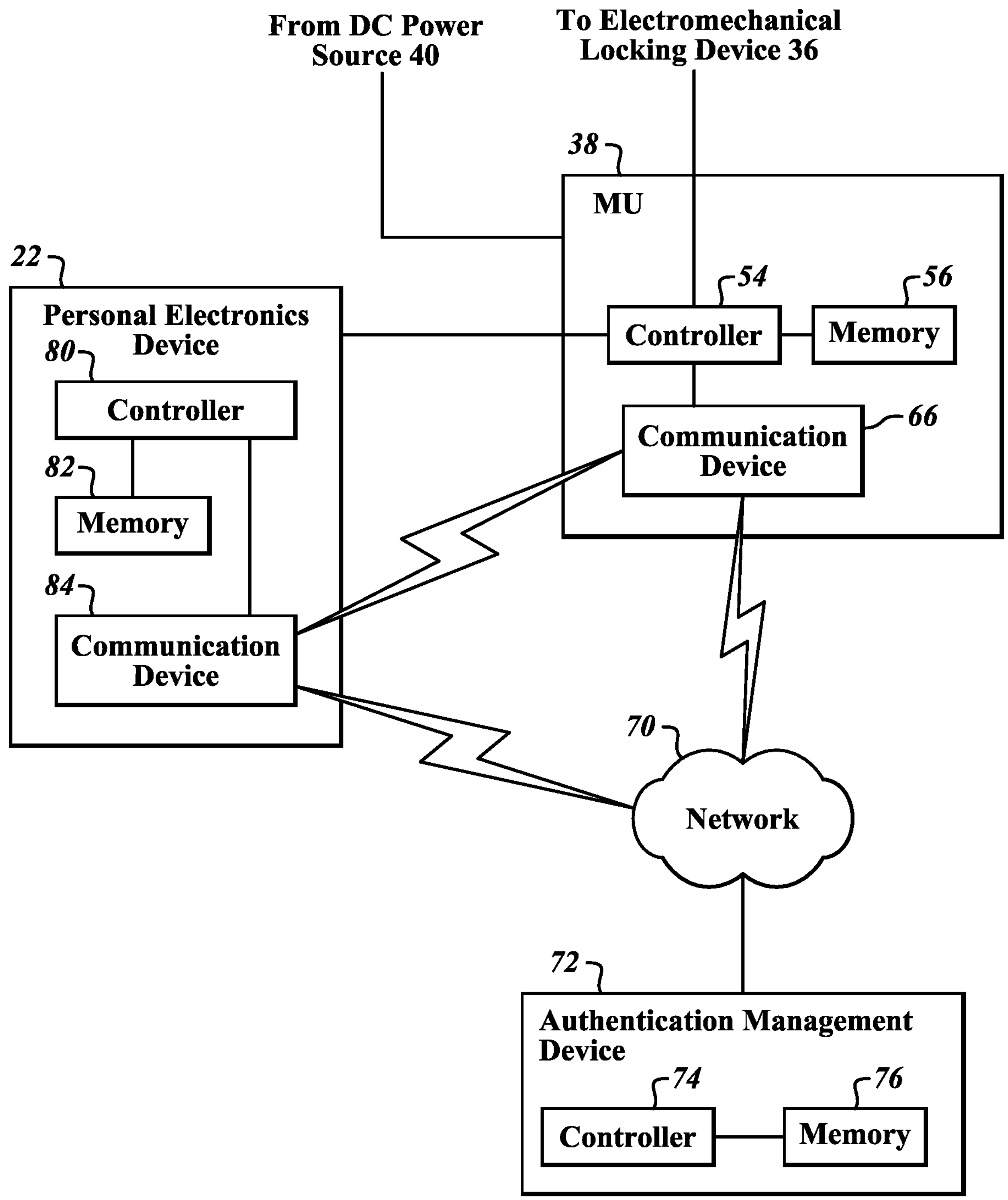
FIG. 3 is a block diagram of illustrative components used in authentication operations.

Referring additionally to FIG. 3, various illustrative components may be used in authentication operations. The management unit 38 may include a controller 54 and a memory 56. The PED 22 may include a controller 80, a memory 82, and a communication device 84. The PED 22 and the management unit 38 may be in data communication with an authentication management device 72. The authentication management device 72 may include a controller 74, a memory 76, and a communication device 66. The PED 22 and the management unit 38 may be in a wireless data communication with the authentication management device 72 via a data network 70. The data network 70 may be a public or private data network.

In various embodiments and given by way of example only and not of limitation, the communication devices 66 and 84 may include a transceiver, such as without limitation, a radio frequency transceiver, an infrared receiver, or the like. The communication devices 66 and 84 may communicate wirelessly, such as without limitation using radio frequency protocols and frequency ranges, such as defined by Wi-Fi, Bluetooth, or the like, or using a direct wired connection, such as through a universal serial bus (USB) port or the like.

In various embodiments and given by way of example only and not of limitation, the electromechanical locking device 36 may include an electrical motor coupled to a locking device, such as a latch, a deadbolt, or the like. Electromechanical locking devices are well known and further description of their construction and operation is not necessary for a person of skill in the art to understand disclosed subject matter.

In various embodiments instructions stored in the memory 56 may cause the controller 54 to retrieve a first identification value for the PED 22 directly from the PED 22 at a time when the source of DC power 40 is sufficiently supplying power to the components of the structure 20. In various embodiments the communication device 84 of the PED 22 may send the first identification value to the management unit 38 via the communication device 66 wirelessly, such as without limitation using radio frequency protocols, such as Wi-Fi, Bluetooth, or the like, or using a direct wired connection, such as through a USB port or the like.

In various embodiments the instructions stored in the memory 52 may cause the controller 50 to receive an access request from the PED 22. The access request may include a second identification value associated with the PED 22 and/or a user of the PED 22. The instructions stored in the memory 52 may cause the controller 50 to further compare the first identification value received from the PED 22 to the second identification value and authenticate the PED 22 responsive to a match existing between the first identification value and the second identification value.

In various embodiments the instructions may cause the controller 50 to receive a first code from the controller 54, store the first code in the memory 52, and receive a second code from the PED 22 via the connector 32. The first code may be generated by the controller 54 when the source of DC power 40 is supplying electrical power to the components of the structure 20. The instructions stored in the memory 52 may cause the controller 50 to compare the first code and the second code and authenticate responsive to a match existing between the second code from the PED 22 and the first code received from the controller 54.

In various embodiments the codes generated by the PED 22 and the controller 50 or 54 may be rolling codes generated according to a predefined encryption algorithm. The encryption techniques may use rolling or hopping code techniques or the like. Encryption techniques, such as those for the purpose identified above, are well known and further description of their construction and operation is not necessary for a person of skill in the art to understand disclosed subject matter.

In various embodiments functions provided by the authentication management device 72 may be distributed amongst multiple devices couplable to the network 70. The memory 76 may include instructions configured to cause the controller 74 to authenticate the PED 22 or a user associated with the PED 22 via a website, an application program with a portion located within the memory 82 of the PED 22, or the like. In various embodiments the instructions stored in the memory 76 may cause the controller 74 to receive a request from the PED 22 via the network 70 to access the structure 20. The instructions stored in the memory 76 cause the controller 74 to authenticate the PED 22 or a user associated with the PED 22 responsive to an access request from the PED 22 and previously stored information in the memory 76 that contains authorized users and/or PEDs information. The instructions stored in the memory 76 may cause the controller 74 to send an authorization code to the maintenance unit 38 of the structure 20 during a previous time when the source of DC power 40 was fully functional. The instructions stored in the memory 76 may cause the controller 74 to send the authorization code to the PED 22 via the network 70. The instructions stored in the memory 52 and/or 56 cause the controller 50 and/or 54 to store the previously sent authorization code in the memory 52 and compare the previously sent authorization code with the authorization code received from the PED 22 upon initiation of an authentication access event.

Figure 4:
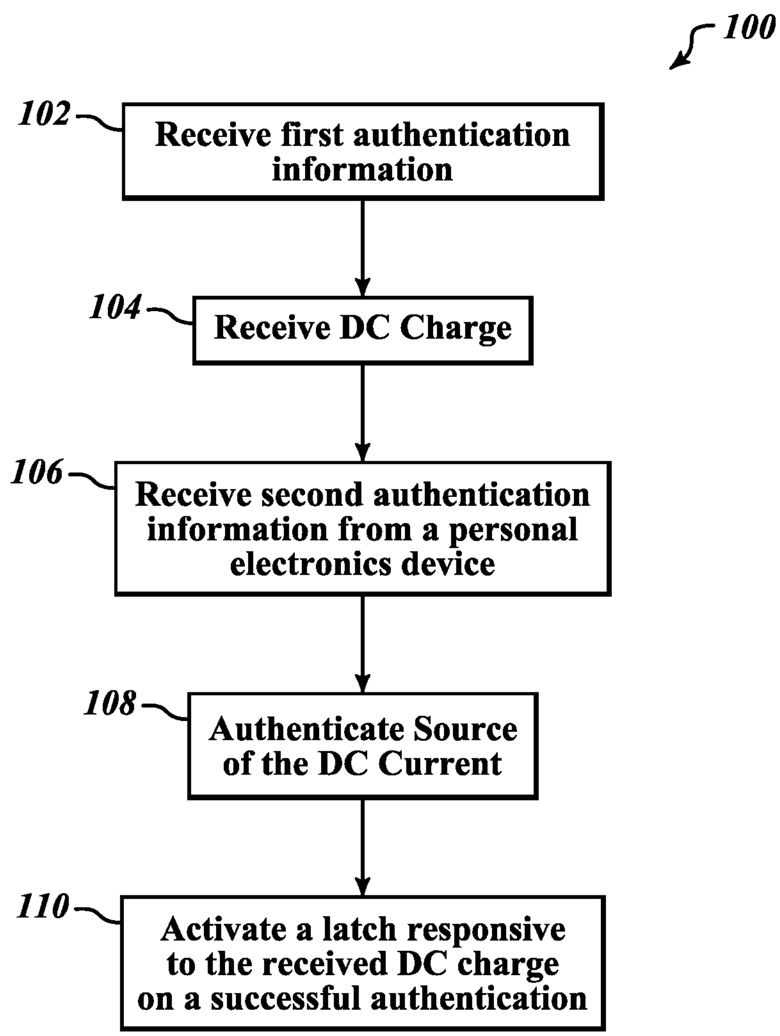
FIG. 4 is a flow diagram of an illustrative method for authenticated access.

Referring additionally to FIG. 4, in various embodiments an illustrative process 100 is provided for authenticated access to a power locked structure. At a block 102, a DC charge is received from a PED. At a block 104, the PED is authenticated. At a block 106, an electromechanical locking device is activated responsive to the received DC charge and a successful authentication.

In some embodiments, an energy storage device may be charged responsive to the received DC charge and the electromechanical locking device may be activated with an electric charge from the energy storage device responsive to the energy storage device having a charge value greater than a threshold amount.

In some embodiments, the PED may be authenticated responsive to an identification value being received from the PED. The identification value may be associated with an operator of the PED. The identification value may be compared to a previously stored identification value and the PED may be authenticated responsive to a match between the received identification value and the previously stored identification value.

In some embodiments, a code may be supplied to the PED and a controller unit associated with the electromechanical locking device. The PED may be authenticated responsive to the code being received from the PED, a comparison of the code received from the PED and the code supplied to the controller unit, and the code from the PED matching the code supplied to the controller unit.

In some embodiments, the PED may be authenticated responsive a first rolling code generated at the PED, a second rolling code generated at a controller unit associated with the electromechanical locking device, and the first rolling code matching the second rolling code.

Those skilled in the art will recognize that at least a portion of the controllers 50, 54, 74, and 80, processors, controllers, components, devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interactive devices (e.g., a touch pad, a touch screen, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:

a connector configured to be operably connected to a personal electronics device and to receive an electric charge from the personal electronics device;

a controller couplable to an electromechanical locking device and the connector; and a memory configured to store computer-executable instructions configured to cause the controller to:

receive first authentication information from the personal electronics device when a DC power source coupled to the controller has sufficient power to allow the controller to receive the first authentication information;

receive the electric charge from the personal electronics device;

receive second authentication information from the personal electronics device with an access request from the personal electronics device to activate the electromechanical locking device;

authenticate the personal electronics device responsive to the received first authentication information and the received second authentication information; and activate the electromechanical locking device to unlock responsive to the received electric charge and a successful authentication based on the received first authentication information and the received second authentication information, wherein, if a voltage supplied by the personal electronics device is less than a voltage for operating the electromechanical locking device, an energy storage device coupled to the controller is charged with the electric charge from the personal electronics device and used to activate the electromechanical locking device, and wherein, if the voltage supplied by the personal electronics device is equal to or greater than the voltage for operating the electromechanical locking device, the electric charge from the personal electronics device is used to directly activate the electromechanical locking device.

2. The system of claim 1, wherein activating the electromechanical locking device further includes activating the electromechanical locking device responsive to the energy storage device having a charge value greater than a threshold amount.

3. The system of claim 2, wherein activating the electromechanical locking device further includes sending direct current (DC) current from the energy storage device to the electromechanical locking device responsive to the energy storage device having the charge value greater than the threshold amount.

4. The system of claim 1, wherein:

receiving the first authentication information includes storing a first identification value;

receiving the second authentication information includes receiving a second identification value from the personal electronics device; and authenticating further includes:

comparing the second identification value to the stored first identification value; and authenticating responsive to a match between the second identification value and the stored first identification value.

5. The system of claim 1, wherein:

receiving the first authentication information includes receiving a first code from a controller of an associated structure;

receiving the second authentication information includes receiving a second code from the personal electronics device; and authenticating includes:

comparing the first code and the second code; and authenticating responsive to a match between the first code and the second code.

6. The system of claim 1, wherein:

receiving the second authentication information includes receiving a first rolling code generated by the personal electronics device;

receiving the first authentication information includes generating a second rolling code; and authenticating includes authenticating responsive to a match between the first rolling code and the second rolling code.

7. The system of claim 1, wherein the energy storage device includes a storage device chose from a rechargeable battery and a capacitor, and wherein the electromechanical locking device is activated based on the charge from the storage device.

8. The system of claim 7, wherein the connector is further configured to receive the electric charge wirelessly from the personal electronics device.

9. The system of claim 1, wherein the instructions are further configured to cause the controller to:

determine the authentication of the personal electronics device is a failed authentication; and keep the electromechanical locking device in a locked state responsive to the failed authentication.

10. A structure comprising:

a direct current (DC) power source;

a lockable panel configured to block an opening associated with the structure;

an electromechanical locking device configured to be operably connected to the DC power source and to put the lockable panel in a locked state and an unlocked state;

a lock controller configured to place the electromechanical locking device in the locked state and the unlocked state using power from the DC power source responsive to an activation action and to provide first authentication information, wherein the first authentication information is received from a personal electronics device when the DC power source has sufficient power to allow the lock controller to receive the first authentication information; and an access system including:

a connector configured to be operably connected to the personal electronics device and to receive an electric charge from the personal electronics device;

a controller couplable to the electromechanical locking device and the connector; and a memory configured to store computer-executable instructions configured to cause the controller to:

receive the first authentication information from the lock controller;

receive the electric charge from the personal electronics device;

receive second authentication information from the personal electronics device with an access request from the personal electronics device to activate the electromechanical locking device;

authenticate the personal electronics device responsive to the first authentication information and the second authentication information; and activate the electromechanical locking device to unlock responsive to the received electric charge and a successful authentication based on the received first authentication information and the received second authentication information, wherein, if a voltage supplied by the personal electronics device is less than a voltage for operating the electromechanical locking device, an energy storage device coupled to the controller is charged with the electric charge from the personal electronics device and used to activate the electromechanical locking device, and wherein, if the voltage supplied by the personal electronics device is equal to or greater than the voltage for operating the electromechanical locking device, the electric charge from the personal electronics device is used to directly activate the electromechanical locking device.

11. The structure of claim 10, wherein activating the electromechanical locking device further includes activating the electromechanical locking device responsive to the energy storage device having a charge value greater than a threshold amount.

12. The structure of claim 11, wherein activating the electromechanical locking device further includes sending direct current (DC) current from the energy storage device to the electromechanical locking device responsive to the energy storage device having the charge value greater than the threshold amount.

13. The structure of claim 10, wherein:

receiving the first authentication information includes storing a first identification value;

receiving the second authentication information includes receiving a second identification value from the personal electronics device; and authenticating includes:

comparing the second identification value to the stored first identification value; and authenticating responsive to a match between the received second identification value and the stored first identification value.

14. The structure of claim 10, wherein:

receiving the first authentication information includes receiving a first code from a controller of an associated structure;

receiving the second authentication information includes receiving a second code from the personal electronics device; and authenticating includes:

comparing the first code and the second code; and authenticating responsive to a match between the first code and the second code.

15. The structure of claim 10, wherein:

receiving the first authentication information includes generating a first rolling code;

receiving the second authentication information includes receiving a second rolling code generated by the personal electronics device; and authenticating includes authenticating responsive to a match between the first rolling code and the second rolling code.

16. A method comprising:

receiving first authentication information from a personal electronics device when a DC power source coupled to a controller has sufficient power to allow the controller to receive the first authentication information;

receiving an electric charge from the personal electronics device;

receiving second authentication information from the personal electronics device with an access request from the personal electronics device to activate an electromechanical locking device;

authenticating the personal electronics device responsive to the first authentication information and the second authentication information; and activating the electromechanical locking device to unlock responsive to the received electric charge and a successful authentication based on the received first authentication information and the received second authentication information, wherein, if a voltage supplied by the personal electronics device is less than a voltage for operating the electromechanical locking device, an energy storage device coupled to the controller is charged with the electric charge from the personal electronics device and used to activate the electromechanical locking device, and wherein, if the voltage supplied by the personal electronics device is equal to or greater than the voltage for operating the electromechanical locking device, the electric charge from the personal electronics device is used to directly activate the electromechanical locking device.

17. The method of claim 16, wherein activating further includes activating the electromechanical locking device with an electric charge from the energy storage device responsive to the energy storage device having a charge value greater than a threshold amount.

18. The method of claim 16, wherein:

receiving the first authentication information includes storing a first identification value;

receiving the second authentication information includes receiving a second identification value from the personal electronics device; and authenticating responsive to a match between the first identification value and the second identification value.

19. The method of claim 16, wherein:

receiving the first authentication information includes receiving a first code from a controller associated with the electromechanical locking device;

receiving the second authentication information includes receiving a second code from the personal electronics device; and authenticating further includes:

comparing the first code and the second code; and authenticating responsive to a match between the first code and the second code.

20. The method of claim 16, wherein:

receiving the first authentication information includes generating a first rolling code at a controller unit associated with the electromechanical locking device;

receiving the second authentication information includes receiving a second rolling code generated at the personal electronics device; and authenticating to match between the first rolling code in the second rolling code.

* * * * *